United States Patent [19]
Odenthal

[11] Patent Number: 5,588,285
[45] Date of Patent: Dec. 31, 1996

[54] SYSTEM FOR LOADING PACKAGES INTO A BOX

[75] Inventor: Heinz F. Odenthal, Zülpich, Germany

[73] Assignee: Ostma Maschinenbau GmbH, Zulpich, Germany

[21] Appl. No.: 498,941

[22] Filed: Jul. 6, 1995

[30] Foreign Application Priority Data

Jul. 12, 1994 [DE] Germany ................ 94 10 970.2 U

[51] Int. Cl.⁶ ............................................ B65B 35/30
[52] U.S. Cl. .................... 53/534; 53/542; 53/171; 53/244; 53/251; 53/260
[58] Field of Search .................... 53/534, 542, 541, 53/251, 260, 171, 244; 271/197; 198/460.3, 689.1

[56] References Cited

U.S. PATENT DOCUMENTS

| | | | |
|---|---|---|---|
| 4,406,359 | 9/1983 | Cole et al. | 198/689.1 |
| 4,676,050 | 6/1987 | Odenthal | 53/542 |
| 4,794,429 | 12/1988 | Acquaviva | 271/197 |
| 4,809,575 | 3/1989 | Swanson | 198/689.1 |
| 5,022,644 | 6/1991 | Bürge | 198/460.3 |
| 5,288,067 | 2/1994 | Stock | 271/197 |
| 5,373,933 | 12/1994 | Planke et al. | 198/689.1 |

FOREIGN PATENT DOCUMENTS 0331210  1/1985  European Pat. Off. .

Primary Examiner—John Sipos
Assistant Examiner—John Paradiso
Attorney, Agent, or Firm—Herbert Dubno; Andrew Wilford

[57] ABSTRACT

A system for packing a plurality of packages into a container has an input conveyor for delivering the packages one at a time at regular intervals and at a constant input speed to a transfer station and an output conveyor having a perforated lower belt and an upper belt together defining a path extending from an upstream end at the transfer station to a vertically displaceable downstream end at a loading station. A container conveyor extends past the loading station for displacing a succession of the containers through the station. A controller connected to all of the drives operates the output conveyor at a low stacking speed to form an overlapped group of the packages on the output conveyor. It periodically switches the output conveyor from the low stacking speed to a high gapping speed when a predetermined number of the packages have been deposited on the output conveyor by the input conveyor to form a space on the output conveyor between succeeding groups of packages. It operates the container conveyor at the low speed and simultaneously moves the output-conveyor downstream end into the lower position dipped into a one of the containers in the loading station to deposit the group of the packages into the container in the loading station. The container conveyor is subsequently operated at the high speed and simultaneously the output-conveyor downstream end is moved into the upper position clear of the container to displace a full container out of the loading station.

4 Claims, 2 Drawing Sheets

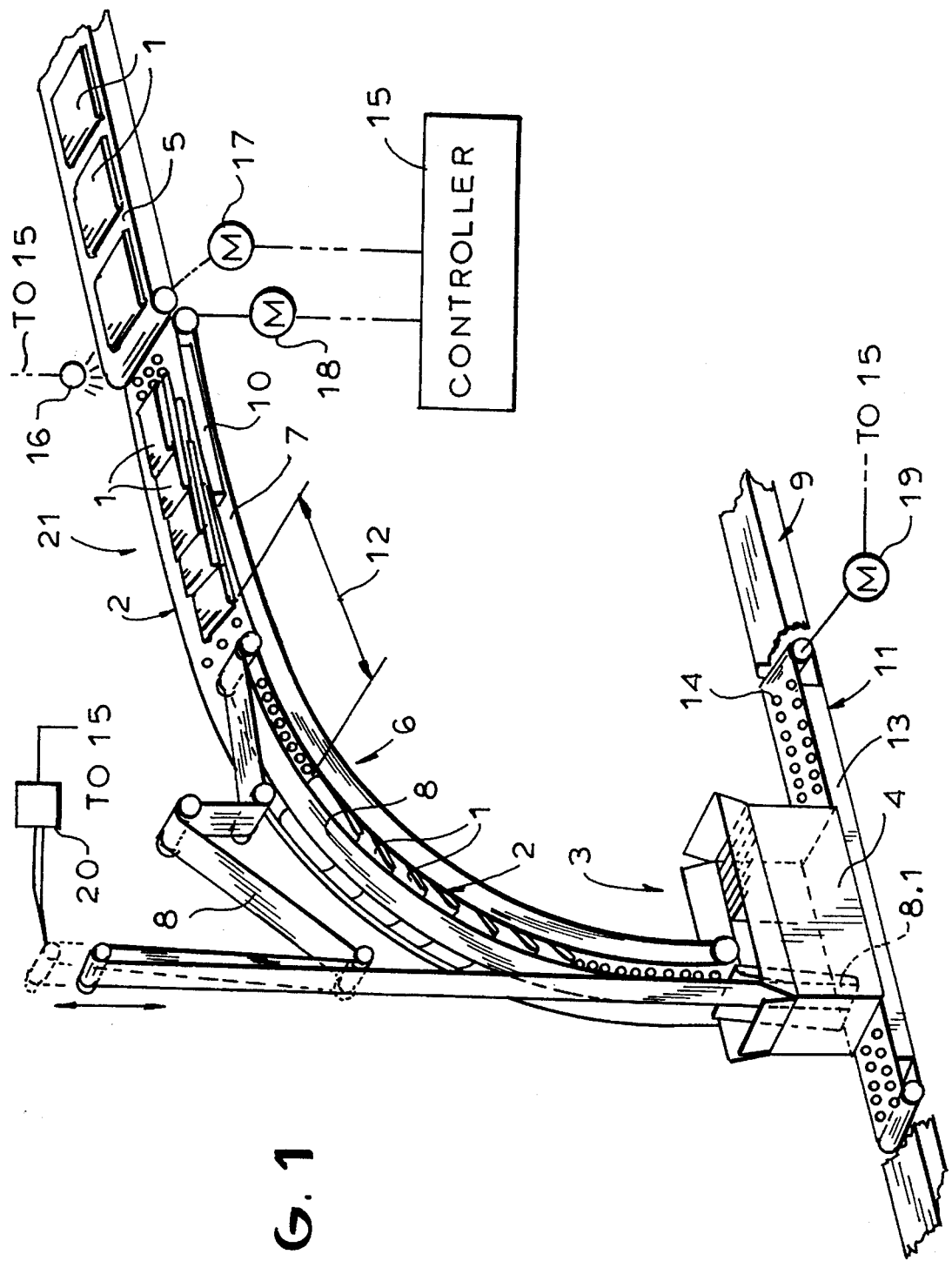

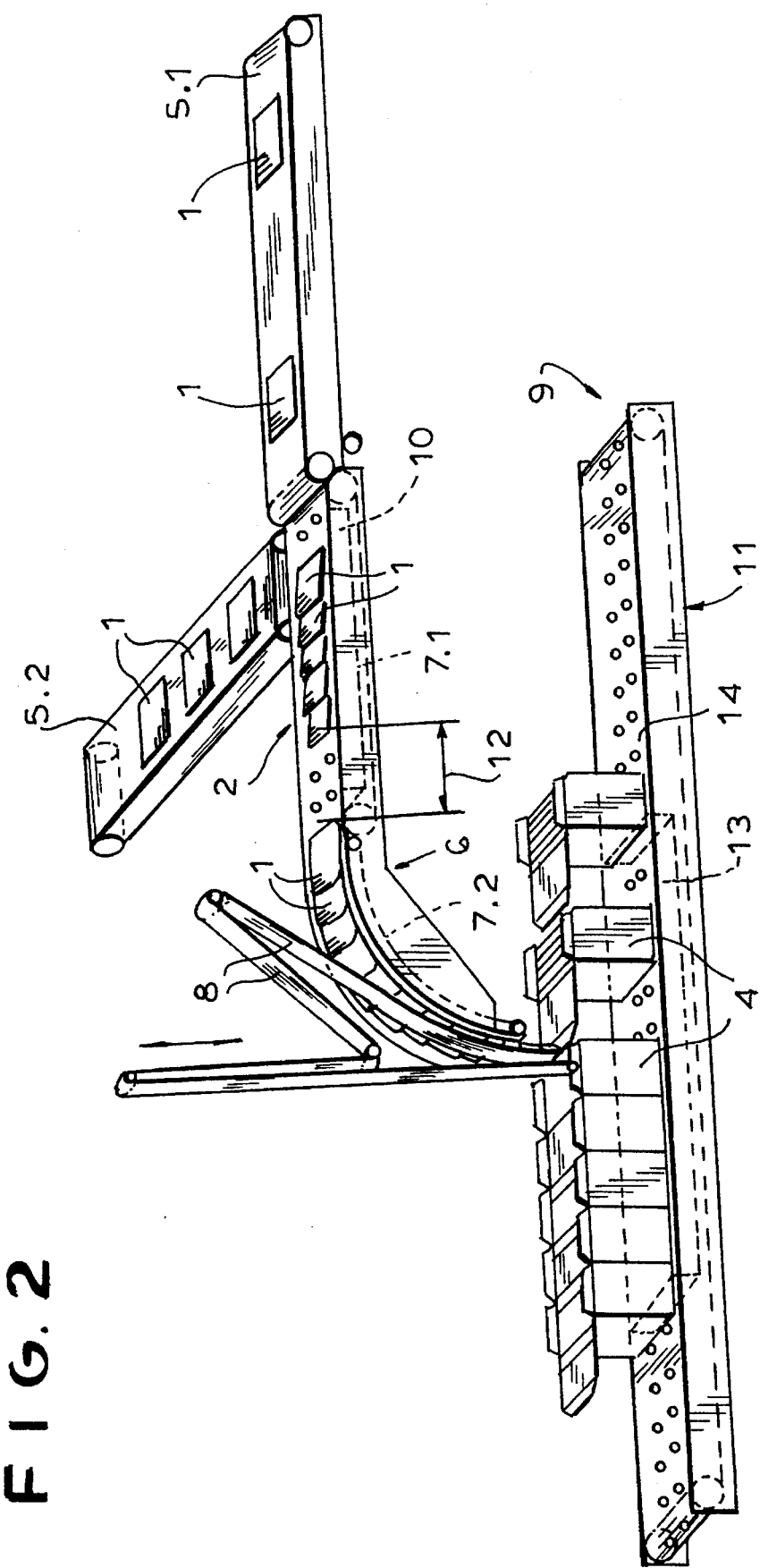

SYSTEM FOR LOADING PACKAGES INTO A BOX

FIELD OF THE INVENTION

The present invention relates to a system for loading a plurality of discrete packages into a container. More particularly this invention concerns packing a plurality of packages of nonstable material into a box.

BACKGROUND OF THE INVENTION

My European patent application 0,331,210 filed 18 Jan. 1985 with a claim to the priority of German application 3,406,858 itself filed 25 Feb. 1984 and my U.S. Pat. No. 4,676,050 describe a system which organizes sequentially and spacedly arriving packages, typically bags or pouches filled with particulate material, into groups and loads these groups into respective containers, normally cardboard boxes. Normally the packages are set on edge in the boxes.

Such a system has an input conveyor which operates at a constant input speed and delivers the packages one after the other at regular intervals to a transfer station where they are dropped on the upstream end of a transfer conveyor. The transfer conveyor normally runs at a stacking speed that is much slower than the input speed so that the packages, which are spaced in the transport direction on the input conveyor, are overlapped on the transfer conveyor. Once the desired number of packages has been deposited by the input conveyor onto the transfer conveyor, this transfer conveyor is briefly accelerated to a gapping speed that is much higher than its normally slow speed and even than the speed of the input conveyor so that a space is formed between the last package of the completed group and the first package of the following group.

The downstream end of the transfer conveyor feeds the groups to the upstream end of an output conveyor formed by a pair of spaced and path-defining conveyor belts that are moved at least during transfer synchronously with the transfer conveyor and that has a downstream end that opens downward above a box conveyor that moves boxes sequentially one after the other past this downstream end. The box in the transfer station is stationary or moves very slowly as the output conveyor deposits a group of the packages into it, and when the box is full the box conveyor moves the full box out of the way and an empty box into position before a new group of packages is ready to be deposited. The downstream end of the output conveyor can be constructed to move vertically, synchronously with the movement of the boxes, to actually dip down into the box in the loading station and ensure accurate and gentle deposition of the packages into the waiting box.

Such a system is relatively efficient but can jam when operated at high speed. In particular the packages can shift as they are being grouped so that the output conveyor cannot handle them correctly.

OBJECTS OF THE INVENTION

It is therefore an object of the present invention to provide an improved system for packing objects into a container.

Another object is the provision of such an improved system for packing objects into a container which overcomes the above-given disadvantages, that is which can operate at higher speed than the above-described system.

SUMMARY OF THE INVENTION

A system for packing a plurality of packages into a container has according to the invention an input conveyor for delivering the packages one at a time at regular intervals and at a constant input speed to a transfer station and an output conveyor having a perforated lower belt and an upper belt together defining a path extending from an upstream end at the transfer station to a vertically displaceable downstream end at a loading station. A container conveyor extending past the loading station under the downstream end of the output conveyor can be advanced at a relatively high container speed and at a relatively low container speed for displacing a succession of the containers through the station. The downstream end of the output conveyor can be displaced between a lower position in a one of the containers in the loading station and an upper position out of the way of the containers passing on the container conveyor. The output conveyor can be displaced with any packages held by it at a relatively low stacking speed that is slower than the input speed and at a relatively high gapping speed that is higher than the input speed so that when the output conveyor is running at the slow stacking speed packages deposited on it by the input conveyor will overlap one another and when the output conveyor is running at the high gapping speed a space will be formed between packages on the output conveyor and packages deposited thereon by the input conveyor. A controller connected to a suction box underneath the lower belt in the transfer station and to all of the drives operates the output conveyor at the low stacking speed to form an overlapped group of the packages on the output conveyor while drawing air in through the lower belt to adhere the packages to the lower belt. It periodically switches the output conveyor from the low stacking speed to the high gapping speed when a predetermined number of the packages have been deposited on the output conveyor by the input conveyor to form a space on the output conveyor between succeeding groups of packages and it operates the container conveyor at the low speed and simultaneously moves the output-conveyor downstream end into the lower position dipped into a one of the containers in the loading station to deposit the group of the packages into the container in the loading station. The container conveyor is subsequently operated at the high speed and simultaneously the output-conveyor downstream end is moved into the upper position clear of the container in the loading station to displace a full container out of the loading station.

Thus with this system a single output conveyor serves not only for forming the necessary gaps between succeeding groups formed on itself, but also for loading these groups into respective containers. This eliminates the need for the prior-art transfer conveyor, thereby substantially simplifying the apparatus. The use of a suction box at the stacking or transfer station ensures that the packages deposited on the lower belt will not shift, but will stay solidly in place so that the output belt can move at high speed. Thus there are no transverse forces that can create product jams in the machine. The machine of this invention can normally pack twice as fast as the above-described prior-art system. The suction box at the same time does not crush the packages, which can contain fragile materials like breakfast cereal or potato chips.

According to this invention the upper belt has an upstream end at a downstream end of the suction box. Thus the upper belt does not cover the lower belt above the suction box, allowing the packages to be sucked down into position before they are gripped between the two belts.

Another suction box is provided underneath the container conveyor at the loading station. The controller applies suction to this box in the loading station during loading of a group of packages therein to stabilize the container. This further ensures that dropping the packages into the container will not shift the container and jam the machine.

The controller according to this invention has a sensor for counting the number of packages deposited by the input conveyor at the upstream end of the output conveyor for switching the output conveyor to the high gapping speed whenever a predetermined number of the packages has been deposited. Thus the entire operation can be automated. The controller switches the container conveyor between its high and low speeds synchronously with switching of the output conveyor between its gapping and stacking speeds. This ensures that the packages are laid in a uniform layer in the container which is moved synchronously with the packages emerging from the downstream end of the output conveyor.

BRIEF DESCRIPTION OF THE DRAWING

The above and other objects, features, and advantages will become more readily apparent from the following description, reference being made to the accompanying drawing in which:

FIG. 1 is a largely schematic view illustrating the system of this invention; and FIG. 2 is a view like FIG. 1 illustrating an alternative arrangement according to the invention.

SPECIFIC DESCRIPTION

As seen in FIG. 1 a system for packing a plurality of packages 1 into a container 4 has an input conveyor 5 for delivering the packages 1 one at a time at regular intervals and at a constant input speed $V_i$ to a transfer station 21 and an output conveyor 6 having a perforated lower belt 7 and an upper belt 8 together defining a path extending from an upstream end at the transfer station 21 to a downstream end 8.1 at a loading station 3. The downstream end 8.1 is vertically displaceable at the loading station 3.

A container conveyor 9 comprised of a belt 11 formed with holes 14 extends past the loading station 3 under the downstream end 8.1 of the output conveyor 6 and can be moved by a drive motor 19 at a relatively high speed and at a relatively low speed for displacing a succession of the containers 4 through the station 3, and can virtually stop at the low speed. Underneath its upper reach is a suction box 13 that can be evacuated to stabilize the containers 4, here cartons, on the belt 11. An actuator 20 connected to the downstream end 8.1 of the output conveyor 6 can displace this end 8.1 between an illustrated lower position in a one of the containers 4 in the loading station 3 and an upper position out of the way of the containers 4 passing on the container conveyor 9.

A drive motor 18 connected to the output conveyor 6 displaces it and any packages 1 held by it either at a relatively low stacking speed $V_s$ that is slower than the input speed $V_i$ or at a relatively high gapping speed $V_g$ that is higher than the input speed $V_i$ so that when the output conveyor 6 is running at the slow stacking speed $V_s$ packages 1 deposited on it by the input conveyor 5 will overlap one another and when the output conveyor 6 is running at the high gapping speed $V_g$ a space 12 will be formed between the group 2 of packages 1 on the output conveyor 6 and the succeeding packages 1 deposited on it by the input conveyor 5.

A suction box 10 is provided underneath the perforated lower belt 7 at the transfer station 21 so that it can pull down and stabilize the packages 1 as they are dropped on to the upstream end of the output conveyor 6. A controller 15 is connected to the suction box 10 and to all of the drive motors 17, 18, and 19 and to the actuator 20. In addition it is connected to a sensor 16 provided just upstream of the transfer station 21 to detect and count the packages 1 as they pass from the input conveyor 5 to the output conveyor 6.

This controller 15 operates the output conveyor 6 at the low stacking speed $V_s$ to form an overlapped group 2 of the packages 1 on the output conveyor 6 while drawing air in through the lower belt 7 by means of the suction box 10 to adhere the packages 1 to the lower belt 7. Once it has detected that the desired number of packages 1, here five, have been formed into a group 2, it switches the output conveyor 6 from the low stacking speed $V_s$ to the high gapping speed $V_g$ to form the space 12 on the output conveyor 6 between succeeding groups of packages 1.

Meanwhile the controller is operating the container conveyor 9 at the low speed and has moved the output-conveyor downstream end 8.1 into the lower position dipped into a one of the containers 4 in the loading station 3 to deposit the group 2 of the packages 1 into the container 4 in the loading station 3. Subsequently the container conveyor 9 is operated at the high speed and simultaneously the output-conveyor downstream end 8.1 is moved into the upper position clear of the container 4 in the loading station 3 to displace the full container 4 out of the loading station 3.

The arrangement of FIG. 2 has two input conveyors 5.1 and 5.2 that extend at right angles to each other to interleave packages 1 on the upstream end of an output conveyor having two lower belts 7.1 and 7.2. When the gap 12 reaches the downstream end of the upstream lower belt 7.1, the belt 7.2 accelerates the group down into one of the containers 4.

I claim:

1. A system for packing a plurality of packages into a container, the system comprising:

means including an input conveyor for delivering the packages one at a time at regular intervals and at a constant input speed to a transfer station;

an output conveyor having a perforated lower belt and an upper belt together defining a path extending from an upstream end at the transfer station to a downstream end at a loading station, the downstream end being vertically displaceable at the loading station;

a container conveyor extending past the loading station under the downstream end of the output conveyor;

means for advancing the container conveyor at a relatively high container speed and at a relatively low container speed for displacing a succession of the containers through the station;

means connected to the downstream end of the output conveyor for displacing it between a lower position in a one of the containers in the loading station and an upper position out of the way of the containers passing on the container conveyor;

means connected to the output conveyor for displacing it and any packages held by it at a relatively low stacking speed that is slower than the input speed and at a relatively high gapping speed that is higher than the input speed, whereby when the output conveyor is running at the slow stacking speed packages deposited on it by the input conveyor will overlap one another and when the output conveyor is running at the high gapping speed a space will be formed between packages on the output conveyor and packages deposited thereon by the input conveyor;

a suction box underneath the perforated lower belt at the transfer station; and control means connected to the suction box and to all of the means for operating the output conveyor at the low stacking speed to form an overlapped group of the packages on the output conveyor while drawing air via the suction box in through the lower belt to adhere the packages to the lower belt, periodically switching the output conveyor from the low stacking speed to the high gapping speed when a predetermined number of the packages have been deposited on the output conveyor by the input conveyor to form a space on the output conveyor between succeeding groups of packages, operating the container conveyor at the low speed and simultaneously moving the output-conveyor downstream end into the lower position dipped into a one of the containers in the loading station to deposit a group of the packages into the container in the loading station, and operating the container conveyor at the high speed and simultaneously moving the output-conveyor downstream end into the upper position clear of the container in the loading station to displace a full container out of the loading station, the control means switching the container conveyor between its high and low speeds synchronously with switching of the output conveyor between its gapping and stacking speeds.

2. The packing system defined in claim 1 wherein the upper belt has an upstream end at a downstream end of the suction box.

3. The packing system defined in claim 1, further comprising a suction box underneath the container conveyor at the loading station, the control means including means for applying suction to the box in the loading station during loading of a group of packages therein to stabilize the container.

4. The packing system defined in claim 1 wherein the control means includes means for counting the number of packages deposited by the input conveyor at the upstream end of the output conveyor for switching the output conveyor to the high gapping speed whenever a predetermined number of the packages has been deposited.

* * * * *